United States Patent [19]
Ouchi et al.

[11] 3,934,960
[45] Jan. 27, 1976

[54] ARRANGEMENT FOR DETACHABLY MOUNTING AN EXAMINING MEMBER ONTO A MICROSCOPE

[75] Inventors: Teruo Ouchi, Hachioji; Hiroshi Isuda, Mitaka, both of Japan

[73] Assignee: Olympus Optical Co., Ltd., Tokyo, Japan

[22] Filed: Oct. 24, 1974

[21] Appl. No.: 517,487

[30] Foreign Application Priority Data
Dec. 15, 1973 Japan.................. 48-142334[U]

[52] U.S. Cl.................................. 350/87; 350/13
[51] Int. Cl.²................................ G02B 21/06
[58] Field of Search............ 350/87, 86, 88, 89, 90, 350/84, 85, 12, 13, 38, 318, 247, 257

[56] References Cited
UNITED STATES PATENTS

| | | | |
|---|---|---|---|
| 1,998,216 | 4/1935 | Bauersfeld............................ | 350/87 |
| 2,214,367 | 9/1940 | Gallasch............................... | 350/84 |
| 3,503,662 | 3/1970 | Grzelak et al. ...................... | 350/88 |

*Primary Examiner*—Alfred E. Smith
*Assistant Examiner*—Jon W. Henry
*Attorney, Agent, or Firm*—Ostrolenk, Faber, Gerb & Soffen

[57] ABSTRACT

An arrangement for detachably mounting an examining member onto a microscope comprises a horizontally extending dovetail key on the examining member, and a horizontally extending dovetail groove formed in the body of the microscope. The dovetail connection permits the examining member to be mounted in place through its horizontal movement, thereby facilitating its mounting and removal.

9 Claims, 7 Drawing Figures

ARRANGEMENT FOR DETACHABLY MOUNTING AN EXAMINING MEMBER ONTO A MICROSCOPE

BACKGROUND OF THE INVENTION

The invention relates to an arrangement for detachably mounting an examining member onto a microscope.

Various examining members are mounted as required onto a microscope, including a stage for placing an object to be examined thereon, a condenser lens for collecting an illuminating beam of light, a holder for detachably retaining a filter, a phase contrast unit, auxiliary optical lens or the like. In the case of a stage, there are a number of types of stages, including a square crisscross stage which is driven by the use of a screw and a rack, a circular rotary stage, a manually operated gliding stage or an immovable plane stage, which are interchanged depending upon the desired manner of observation. Thus it is necessary that the mounting and removal of an examining member onto the body of the microscope be facilitated and efficiently made. A conventional arrangement for interchanging such examining members comprises a vertical dovetail construction for moving an examining member vertically relative to the body of the microscope, as illustrated in FIG. 1, which shows such construction for a circular rotary stage. In FIG. 1, the microscope shown includes a body 1 which is provided with an operating knob 2 for vertically moving a stage support 3 therealong. As shown in FIG. 2, the support 3 includes an examining member mount 51 in which a dovetail key 3a is formed. An attachment 4 is secured to a stage 5, and includes a stage attaching portion 41 which comprises a dovetail groove 4a that is adapted to provide a close fit with the dovetail key 3a, as shown in FIG. 3. The mount 51 and the stage attaching portion 41 essentially comprise a vertical dovetail connection mechanism.

The stage 5 can be mounted on the body 1 of the microscope by engaging the dovetail groove 4a with the dovetail key 3a and securing the attachment 4 to the support 3 by means of a set screw 6, and can be removed therefrom by a reverse procedure. The microscope body 1 includes a base 7 at its bottom and carries a lens barrel 10 at its top, the lens barrel including an objective assembly 8 and an eyepiece assembly 9. An object to be examined is placed on the stage 5, and can be observed through a lens 8a on a revolver 8 and through the eyepiece assembly 9. The revolver 8 comprises a turret so as to permit a change of objective lenses 8a, 8b for the purpose of varying the magnification. The stage 5 is further provided with a screw 5a which locks it against rotation.

With a stage mounting arrangement of such vertical dovetail type, when a stage is to be replaced, the set screw 6 is loosened and the stage 5 is moved upward relative to the body 1 for the purpose of removal therefrom. However, the distal end of the objective lenses 8a, 8b or the like presents a hindrance to such movement of the stage, and thus an inconvenience is experienced in that the operating knob 2 must be initially operated to lower the support 3 to its lowermost position before the dismounting can be effected. If the stage is dismounted from its fully lowered position, the stage 5 may inadvertently be struck against the distal end of the objective lenses 8a, 8b, resulting in a damage in the upper surface of the stage 5 or the expensive objective lenses 8a, 8b, even to a degree such that the objective lenses 8a, 8b may be rendered unusable. While it may appear that such disadvantages would be overcome by providing a sufficient spacing between the stage 5 and the distal end of the objective lenses 8a, 8b when the stage 5 is in its lowermost position, this would result in an increased spacing between the base 7 of the microscope and the distal end of the objective lenses, with consequence that in use, the level of the stage 5 and hence of the eyepiece assembly 9 will be high enough to cause an inconvenience in the observation as well as a difficulty in carrying about the microscope.

As is recognized, a condenser must be disposed below the stage, and a filter or an auxiliary lens may be similarly provided as required in such position. Thus there is a need to secure a holding frame to the lower surface of the stage for holding a condenser, filter, auxiliary lens or the like, and the provision of such frame causes a further difficulty in the mounting and removal of the stage. With a metallurgical microscope, specimens are often ores of a relatively large size, which requires that a relatively large spacing be provided between the distal end of the objective lenses 8a, 8b and the stage 5, thus precluding the choice of an elevated position for the stage 5 in use.

SUMMARY OF THE INVENTION

In view of the foregoing, the invention provides an arrangement for detachably mounting an examining member onto a microscope in which an examining member such as stage, condenser, auxiliary lens, filter or the like can be moved in a horizontal direction relative to the body of the microscope.

In accordance with the invention, the mounting arrangement comprises a horizontally extending dovetail key formed on a mount of a support which is used to move a stage or the like in the vertical direction, and a horizontally extending dovetail groove formed in an examining member such as stage or condenser. In this manner, the mounting and removal of an examining member is facilitated without lowering the support. By forming a dovetail groove of similar configuration and size in the attachment of the respective examining members so as to be a close fit with the dovetail key on the mount of the stage support, any examining member can be selectively mounted for use. Thus, a replacement of various stages as well as the mounting or removal of examining members other than the stage is greatly facilitated, permitting an efficient microscope observation procedure using various observation techniques without involving the risk of damaging the objective lenses as found in the prior art.

DETAILED DESCRIPTION OF A PREFERRED EMBODIMENT

Figure 1:
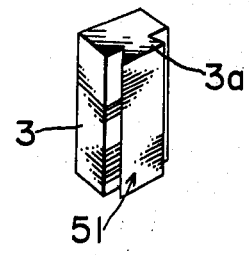
FIG. 1 is a schematic side elevation of a microscope having a conventional arrangement for detachably mounting an examining member.
Figure 2:
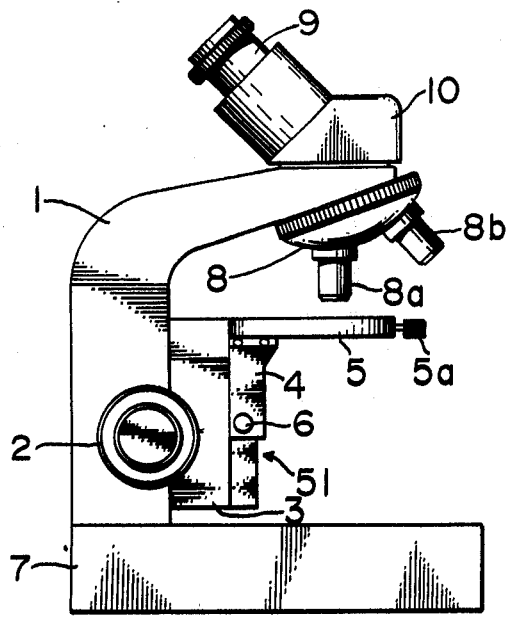
FIGS. 2 and 3 are perspective views of the mount of an examining member and a stage used in the microscope shown in FIG. 1.
Figure 3:
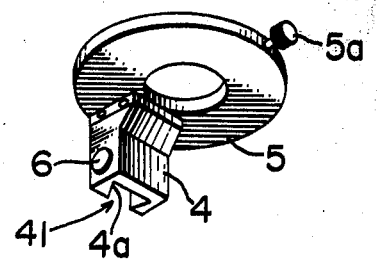
Figure 4:
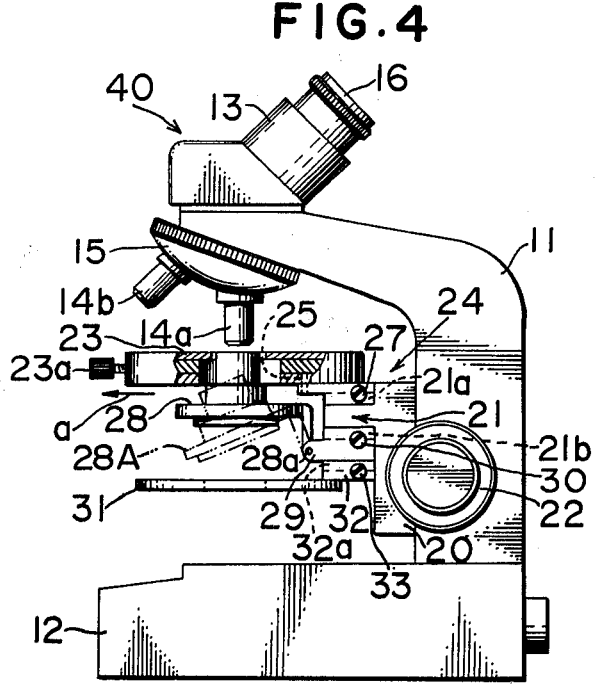
FIG. 4 is a schematic side elevation of a microscope having the arrangement for detachably mounting an examining member constructed in accordance with the invention.
Figure 5:
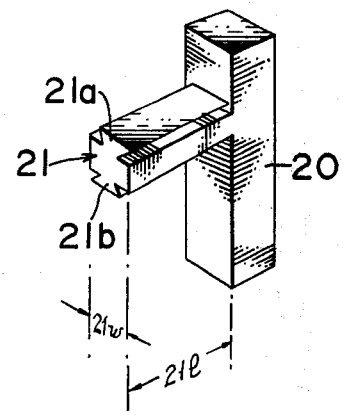
FIGS. 5 and 6 are perspective views of the mount of an examining member and the stage used in the microscope shown in FIG. 4.
Figure 6:
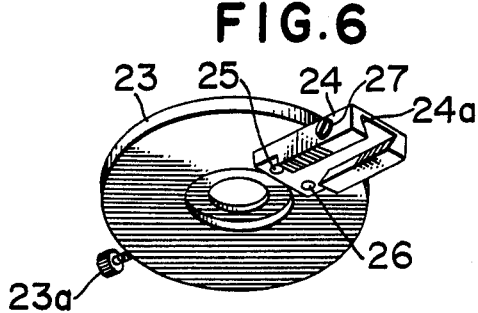
Figure 7:
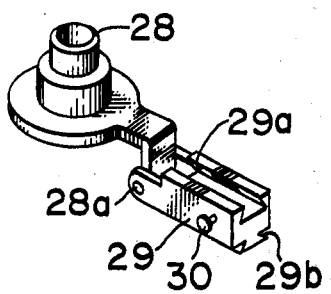
FIG. 7 is a perspective view of a condenser used in the microscope of FIG. 4.

Referring to FIGS. 4 to 7, an embodiment of the invention will be specifically described. FIG. 4 shows a microscope 40 having a stage or condenser mounted thereon, and which includes the arrangement for detachably mounting an examining member according to the invention. The microscope 40 includes a body 11, base 12, lens barrel 13, objective lenses 14a, 14b, revolver 15 and an eyepiece assembly 16, all of which are constructed in the similar manner as those used in a conventional microscope and therefore will not be described herein in detail. A support 20 is adjustably mounted on the body 11 so as to be slidable in the vertical direction by turning an operating knob 22 when a stage is to be moved vertically. The support 20 has a horizontally extending mount 21 integrally therewith or secured therewith. As shown in FIG. 5, the mount 21 is formed with a pair of dovetail keys 21a and 21b on its upper and lower surfaces, respectively. On its bottom surface, a stage 23 has an attachment 24 secured thereto by means of screws 25 and 26 (see FIG. 6), and the attachment 24 is formed with a dovetail groove 24a (see FIG. 6) which is configured to provide a close fit with the dovetail key 21a. The arrangement is such that the attachment 24 is secured in place on the mount 21 by engaging the dovetail groove 24a with the dovetail key 21a and securing stage 23 and mount 21 together by means of a locking screw 27. A regular or phase contrast condenser 28 is associated with a condenser attachment 29 which is pivotally mounted thereto at 28a. In its upper surface, the attachment 29 is formed with a dovetail groove 29a (see FIG. 7) which is configured to provide a close fit with the dovetail key 21b so that the condenser can be secured in place by a screw 30 in the similar manner as the attachment 24 associated with the stage 23. It should be understood that the condenser 28 is constructed so that it can be secured in its normal position shown in solid line in FIG. 4. On its lower surface, the attachment 29 is provided with a dovetail key 29b (see FIG. 7), and a filter frame 31 is associated with an attachment 32 (see FIG. 4) which is provided with a dovetail groove 32a for engagement with the dovetail key 29b on the condenser attachment 29, the attachment 32 being secured to the condenser attachment 29 by means of a screw 33. It will be noted in FIG. 6 that the stage 23 is provided with a screw 23a which locks it against rotation. It will be appreciated that other examining members such as an auxiliary lens may be secured in a suitable place by using a corresponding attachment. In those cases where a stage is used with a metallurgical microscope, the stage may be provided with an attachment similar in construction to attachment 24 associated with the stage 23, with its dovetail groove facing upward, and such dovetail groove may be engaged with the dovetail key 21b provided on the lower surface of the mount 21 on the body of the microscope. In this instance, it will be noted that unlike the stage 23, this dovetail groove engages with the dovetail key 21b formed on the lower surface of the mount 21, so that the surface of the stage assumes a lower level. As a consequence, increased separation is provided between the stage and distal end of the objective lenses 14a, 14b, permitting an increased operational distance for satisfactory observation of minerals or ores of a larger size.

With the above arrangement of the invention, when it is desired to change a stage 23, the condenser 28 is pivoted to a position 28A shown in phantom lines in FIG. 4 in which its free end has moved down, thus moving it away from the central portion of the stage 23, and subsequently the clamping screw 27 is loosened and the stage 23 moved in the direction indicated by an arrow a. Thereupon, the attachment 24 secured to the bottom of the stage 23 can be removed from the dovetail key 21a together with the stage 23. When replacing another stage 23, the dovetail groove 24a formed in the attachment 24 associated with the new stage may be engaged with the dovetail key 21a formed on the mount 21 and the attachment can be secured in place by means of the screw 27. Thereafter, the condenser 28 is restored to its original position and secured in place. By providing other stages with an attachment having a horizontally extending dovetail groove formed therein in a similar manner as the circular stage 23, it will be appreciated that these various stages can be interchanged in a simple manner.

While in the above description, the attachment has been secured to the mount of the support by means of the screws, any other securing means may be used. For example, the dovetail groove in the attachment may be formed by a pair of split members which are movable relative to each other in a direction which varies the spacing therebetween so that at least one of the split members may be moved relative to the other in a direction to reduce the spacing therebetween when mounting an examining member and then separated from one another so as to hold the associated dovetail key by an interference fit. For removal, one of the split members may be moved in a direction to reduce the spacing between the split means and thereby increase the spacing between the cooperating dovetail key and dove. It should also be appreciated that the provision of the dovetail key and groove on the mount of the microscope and in the attachment of an examining member may be freely interchanged as dictated by the requirements of a particular application. Also it is to be noted that the dovetail key and groove may extend along the top or bottom surface or along one of the side surfaces of the associated mount or attachment, providing only that the direction in which they extend is horizontal. By way of example, FIG. 5 shows that the mount 21 of a microscope 40 has a length 21l along which the dovetail key 21a extends and a width 21w, both of which extend horizontally. In an alternative arrangement, the width of the dovetail key may be in a vertical plane and the dovetail groove in the attachment 24 of the stage 23 may also be formed to extend in the vertical plane while permitting a mounting and removal in the horizontal direction in the similar manner as illustrated in the drawings.

What is claimed is:

1. Detachable mounting apparatus for use with a microscope having support means movable in a first plane towards and away from optical objective means, comprising:

a support member extended from said support means in a second plane substantially perpendicular to said first plane, said support member having a first dovetail joint portion formed on each of a pair of opposed surfaces extended in said second plane;

means for supporting a specimen to be examined;

a first examination accessory member;

each of said specimen support means and said first examination accessory member having a cooperating dovetail joint portion extended in said second plane and adapted to detachably closely mate with one of said first dovetail joint portions to independently rigidly position each of said specimen support means and said first examination accessory member to one of said pair of opposite support member surfaces and within the viewing cone of said optical objective means, whereby each of said specimen support means and said first examination accessory member is independently removable from said support member by sliding disengagement of said first and cooperating dovetail joint portions in said second plane without disturbing the position relative to said microscope and said movable support means of the other one of said specimen support means and first examination accessory member.

2. An arrangement according to claim 1, in which said specimen support means and said first examination accessory member each include an attachment member extended therefrom in said second plane, each attachment member having one of said cooperating dovetail joint portions formed in said first plane on a surface thereof.

3. An arrangement according to claim 2, in which each of said first pair of dovetail joint portions is a dovetail key extended in said first plane outwardly from one of said support member opposed surfaces; and each said attachment member cooperating dovetail joint portion is a cooperating dovetail groove formed into a first surface of said attachment member.

4. An arrangement according to claim 1 in which said first examination accessory member further includes a second dovetail joint portion extended in said second plane in another surface opposite said cooperating dovetail joint portion; and a second examination accessory member having another attachment member extended in said second plane, said another attachment member having another cooperating dovetail joint portion adapted to detachably closely mate with said second dovetail joint portion to rigidly position said second examination accessory member thereto.

5. An arrangement according to claim 4 in which said second examination accessory member is a filter.

6. An arrangement according to claim 1 in which the specimen support means is a stage.

7. An arrangement according to claim 1 in which said first examination accessory member is a condenser lens.

8. An arrangement according to claim 1 in which said first examination accessory member is phase contrast condenser.

9. An arrangement according to claim 1 in which said first examination accessory member is a filter holder.

* * * * *